(12) United States Patent
Cheuk et al.

(10) Patent No.: US 6,440,485 B1
(45) Date of Patent: Aug. 27, 2002

(54) PET FOOD COMPOSITION AND METHOD

(75) Inventors: Wai Lun Cheuk; Mark Lee Dierking, both of Topeka, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 0 days.

(21) Appl. No.: 09/962,399

(22) Filed: Sep. 25, 2001

(51) Int. Cl.⁷ .................................................. A23K 1/18
(52) U.S. Cl. ........................ 426/646; 426/641; 426/615; 426/661; 426/805
(58) Field of Search ................................ 426/641, 661, 426/615, 805, 646

(56) References Cited

U.S. PATENT DOCUMENTS

| | | | | |
|---|---|---|---|---|
| 3,574,633 A | * | 4/1971 | Flier | 99/2 |
| 3,653,908 A | * | 4/1972 | Buck et al. | 99/2 |
| 3,865,966 A | * | 2/1975 | Coppage et al. | 426/372 |
| 4,410,551 A | * | 10/1983 | Comer | 426/99 |
| 4,781,934 A | * | 11/1988 | Martia et al. | 426/646 |
| 4,895,731 A | * | 1/1990 | Baker et al. | 426/641 |
| 5,004,624 A | * | 4/1991 | Koschak et al. | 426/623 |
| 6,203,825 B1 | * | 3/2001 | Hodgkins | 426/2 |

* cited by examiner

*Primary Examiner*—Chhaya D. Sayala
(74) *Attorney, Agent, or Firm*—Martin B. Barancik

(57) ABSTRACT

A canine pet food composition comprising a meat based material having an essentially solid mass assuming the shape of the container in which it is packed, said pet food having meat particles with a moisturized appearance and visually recognizable discrete food particles upon slicing the pet food mass after departure from the said container.

4 Claims, 4 Drawing Sheets

PET FOOD COMPOSITION AND METHOD

BACKGROUND OF THE INVENTION

Pets have been fed "dry" and "wet" diets for many years. "Wet" diets are generally packaged in a can-like container. They are "wet" in appearance because of the moisture therein. Generally two types of wet diets are presently prepared. One is usually referred to in the industry as ground loaf. This is generally prepared by contacting all the key components such as the meat and grain together with water and then heating and mixing together in a series of apparatuses, a single apparatus, or one apparatus, such as a thermal screw cooker/mixer. In this manner all of the major components as well as the minor components such as colorants, oils, vitamins, and vitamin-like materials are combined at an early preprocessing step and all processed together.

Following this procedure an essentially homogeneous, intracellular honeycomb-type (hence "ground loaf") mass is produced which is readily packaged into a cylindrical container. A second wet diet is generally referred to in the industry as "chunk and gravy". This wet diet is usually produced by grinding meat, mixing, emulsifying, and then mixing the meat further with water, oil and grains and other materials if desired. This mixture is then fed into a cooking apparatus, emitted therefrom, cut, cooled and then sent for various stage fills. Usually in a two-stage fill, a gravy is added to the chunk. The gravy is prepared in the usual manner, for example, by mixing grains, starches, water, vitamins, if desired, and other materials into a mixing tank wherein it is heated and then fed to the container holding the chunky materials. As opposed to the ground loaf, this diet has physically separated, discrete chunks-pieces-of the ground meat and grains as prepared. These discrete particles are present in the gravy-type liquid in the final container. The product produced by "chunks and gravy" process has been used in pet food for many years.

As opposed to these standard forms of wet diet, a new composition, which can be potentially described as a hybrid of the two distinct physical forms of ground load and chunk/gravy, has now been discovered and is specifically designed for canines. The new physical form is prepared by a process which utilizes two distinct sub processes; a thermal process to preserve the physical and to an extent the chemical integrity of the meat component and a modified-gravy making process to bind the meat mix and the grain mix so as to enhance a "hearty-ground" appearance which has visually recognizable discrete meat particles within the essentially homogeneous mass of the finished product. This new process can result in substantial cost reduction in capital investment for machinery as well as labor. This process and novel "chili" composition is extremely difficult to achieve for a canine product because of the lower quantity of meat present in its diet in comparison to a feline, for example, 20–35% in canine and 40–70 wt. % in feline. The difference is made up in additional grains which further accentuates the difficulty in achieving this visibly distinct canine diet.

SUMMARY OF THE INVENTION

In accordance with the invention, there is a canine pet food composition comprising a meat based material having an essentially solid mass assuming the shape of the container in which it is packed, said pet food composition having visually recognizable discrete meat particles with a moisturized appearance upon slicing the pet food mass after departure from the said container.

A further aspect of the invention is a meat and grain based canine pet food composition, which visually is a hybrid between a ground loaf and chunk and gravy prepared by a process comprising (a) heating the meat portion of the composition to a temperature at or below the denaturation point of the meat portion, (b) separately from the meat portion, and portion (c) mixing grain or a mixture of grains together with water to an elevated temperature that will achieve or essentially achieve hydration, gelatinization and retrogradation of the grain or mixture of grains, and breakdown or essentially breakdown complex carbohydrate to simpler carbohydrate;

(c) separately from the meat portion (a) and grain (b) preparing a viscosity building fluid or slurry which when combined together with components (a) and (b) forms at least an essentially homogeneous mass during a container filling process, and (d) combining and mixing (a), (b) and (c) while maintaining temperature of combined mass.

A still further aspect of the invention is a process for preparing meat and grain based composition canine pet food, which comprises (a) heating the meat portion of the composition to a temperature at or below the denaturation point of the meat portion, (b) separately from the meat portion, and portion (c) mixing grain or mixture of grains together with water to an elevated temperature that will achieve or essentially achieve hydration, gelatinization and retrogradation or mixture of grains, and breakdown or essentially breakdown complex carbohydrate to simpler carbohydrate, (c) separately from the meat portion (a) and grain (b) preparing a viscosity building fluid or slurry which when combined together with components (a) and (b) forms at least an essentially homogeneous mass during a container filling process, and (d) combining (a), (b), and (c) while maintaining temperature of combined mass.

DETAILED DESCRIPTION OF THE INVENTION

Figure 1:
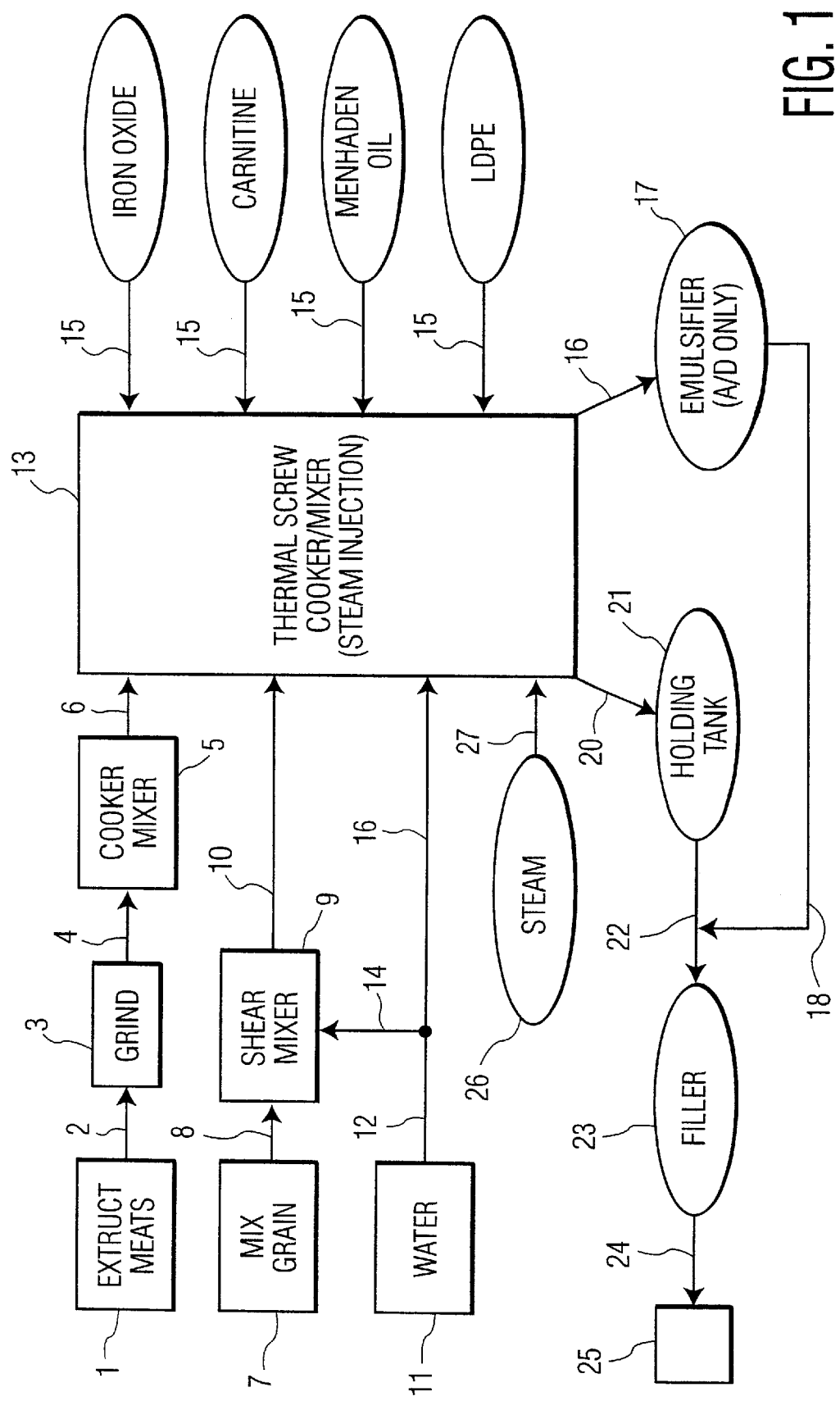
FIG. 1: Prior art ground loaf process

Traditionally, containerized pet food such as canned pet food is divided into two categories: chunk and gravy type products and ground loaf product.

The chunk and gravy product comprises a preformed meat particle prepared by making a meat emulsion which is extruded and formed by physical pressure or thermal energy such as cooking with steam, cooking in water, oven dry heat and the like. A product, cooked meat, is diced into chunks, which are eventually mixed with a gravy or sauce. The two components are then filled into a container, usually a can, seamed and sterilized.

A ground loaf product is generally prepared by mixing the various components, for example, meats, grains, vitamins, minerals and water, usually by steam and added water. The solid components are previously ground together. The total meat, grain, water and other component mixture is then heated to a low temperature of 60° F. or to a higher range of 180–200° F. depending upon the specific components. The products are filled in the cans, seamed and retorted for sterility. The finished product generally has a moisture range of about 65% to about 85%. These ground loaf products can be made on a batch to batch basis or a continuous process in which the three major components, meats, grains and water are continuously added and mixed together in a thermal screw cooker/mixer. During this process, and particularly at this stage, everything is treated as a single ingredient regardless of the physical or chemical characteristic of the individual ingredient, component and the formulation. Examples of such physical and chemical properties are boiling point difference, gelatinization temperature of grain-types, protein denaturation temperature of the various meats, and the like. As a result of such processing, there is a wide range of textural differences in terms of softness and firmness, stickiness and mushiness and other easily evaluated parameters of the final composition, which occur from batch to batch and composition to composition.

Therefore, it is an advantage of this invention that various components in the formulation, particularly the components such as meat and grains, are processed to bring out their optimal physical and chemical characteristics for presence in the final composition. This gives a more consistent and controllable product.

Still further the processing of the invention brings about a final product which has a better texture, is firmer and/or less sticky. This inventive process increases the chemical and physical functionality of each component in the formulation. Each one has a tendency to maintain its own discreteness and integrity.

As mentioned previously, the normal ground loaf process mixes all components and then heats it to an approximate temperature range of about 180° F. to 200° F. for canine products. In this new process the meat components are "thermally set" at and/or below temperatures of protein denaturation of the mixture and heated essentially by themselves, that is, with the essential or total absence of grains, additional water, vitamins, minerals, and the like. This heating process generally improves the texture of the meats by inactivating the bacterial and tissue enzyme processes, it is believed, thereby providing a final pet food composition which is friable, that is, breaks under stress. The temperature treatment is such that a slight coagulation of the protein occurs which contributes to the moisturized appearance of the protein in the final product.

The grains may also be treated separately and then added to the previously "thermally set" meat. The grains are mixed and cooked at a temperature range which will achieve or essentially achieve hydration, gelatinization, and retrogradation so as to improve their binding to the meats and/or reduce the stickiness or increase the firmness of the finished product texture. Additionally, complex carbohydrate is broken down to simpler carbohydrate. An Elevated temperature is needed to accomplish these properties. Basically, temperatures up to 180–200° F. but desirably not exceeding 180–185° F. can be employed.

Finally, various "gravy" type components are made by heating such as native starches, water and the like to prepare a viscosity building slurry or fluid. The purpose of such preparation is to increase the cohesiveness of the two components (a) and (b) so as to maintain an essentially or totally homogenous mass during the filling process into the container.

With respect to the meats, "thermal setting" is achieved by heating the meat components to, or directly below, the temperature of denaturation of the meat protein. This generally ranges from about 120° F. to 125° F. for fish protein to about 180° F. or higher for skeletal muscle protein of cattle. Lying somewhere in between this range are the denaturation temperatures of muscles from chicken and pigs. If there is a combination of such meats, the temperature of heating is at or below the denaturation temperature of the mixture. This can be fairly ascertained by the texture and/or the color of the mixture.

With respect to grains, grain when exposed to thermal treatment with added water will go through processes including hydration, gelatinization and retrogradation. Additionally, at the elevated temperature, breakdown of complex carbohydrate to simpler carbohydrate is achieved. By properly balancing carbohydrate sources, one can obtain the proper stickiness or binding for maintaining certain textures as desired. For example, short chain polysaccharides tend to be sticky and gluey and longer chain polysaccharides are less sticky and gluey than the shorter chain. Generally, simple sugars such as sucrose and glucose are capable of "binding" which is detrimental if one desires a friable texture of the finished product of this invention. Basically the desired texture of this hybrid diet is achieved by longer chain polysaccharide and starches, such as native or non-chemically modified starches such modifications by heat and/or pressure. Examples of grains which can be employed are the standard or natural, chemically non-modified materials such as cornstarch, potato starch, cellulose and rice starch. Exemplary of these natural starches are National Starch 150, a natural corn starch, and natural potato starch. Heat and/or pressure treated materials can also be employed such as Novation 1600 a heat and pressure treated potato starch available from National Starch, Novation 2700 a heat and pressure treated corn starch also available from National Starch and heat and pressure treated rice starch such as Remy DR. These natural and heat and/or pressure treated grains have the further advantage in maintaining proper gastrointestinal tract balance and good overall stool quality.

The gravy type components of "c" of the invention include native starch such as National Starch 150 and various non-chemically and chemically modified starches such as dextrin. These materials include Novation 1600, a potato starch; Novation 2300, a corn starch, and Remy D R, a rice starch.

By utilizing appropriate carbohydrate sources, one can obtain the proper stickiness or binding which helps provide the desirable friable texture in the finished canine product.

The components are heated with water to about 180–200° F. to provide a viscosity buildup slurry or fluid so as to maintain an essentially or totally homogeneous mass during the filling process while post retorting (after filling) these material(s) will retrograde to deliver the desired characteristics such as friable texture in the final packaged canine diet when opened for consumption.

Below are descriptions of the two prior art processes and the inventive process of this disclosure. In this manner the differences are easily ascertained.

DETAILED DESCRIPTION OF DRAWINGS

The prior art ground loaf process is generally carried out in the art as described in FIG. 1. Meats are reduced in size in an extructer 1, and transferred through line 2 to a grinder 3. The ground meats are transferred through a line 4 to a cooker/mixer 5 where the meat slurry is cooked. The cooked slurry is fed through line 6 to a thermal screw cooker/mixer 13. The grains used in the ground loaf diet are mixed in a mixer 7 and transferred through line 8 to a shear mixer 9 where they are sheared together with water from container 11, fed via line 12 and 14 to the shear mixer 9. The contents of the shear mixer are then transferred to the thermal screw cooker/mixer 13 through line 10. Additional water can be transferred through lines 12 and 16 to the thermal screw cooker/mixer, 13. Steam 26, is then added through 27 to the thermal screw cooker/mixer where necessary and the ground loaf diet is heated and mixed through the shear of the screw cooker mixer to the usual temperature for diets. Generally, for a canine diet this temperature is about 180–200° F. Also present in the thermal screw cooker mixer 13, are various small quantities of additives such as iron oxide, carnitine, oil, and liquid flavors transferred through line 15. The properly cooked mixed and extructed canine diet is then transferred through line 16 to an emulsifier 17 or transferred through line 20 to a holding tank line 21 wherein it is transferred to a filler 23 through line 22, wherein they are filled through line 24 to the final container 25.

Figure 2:
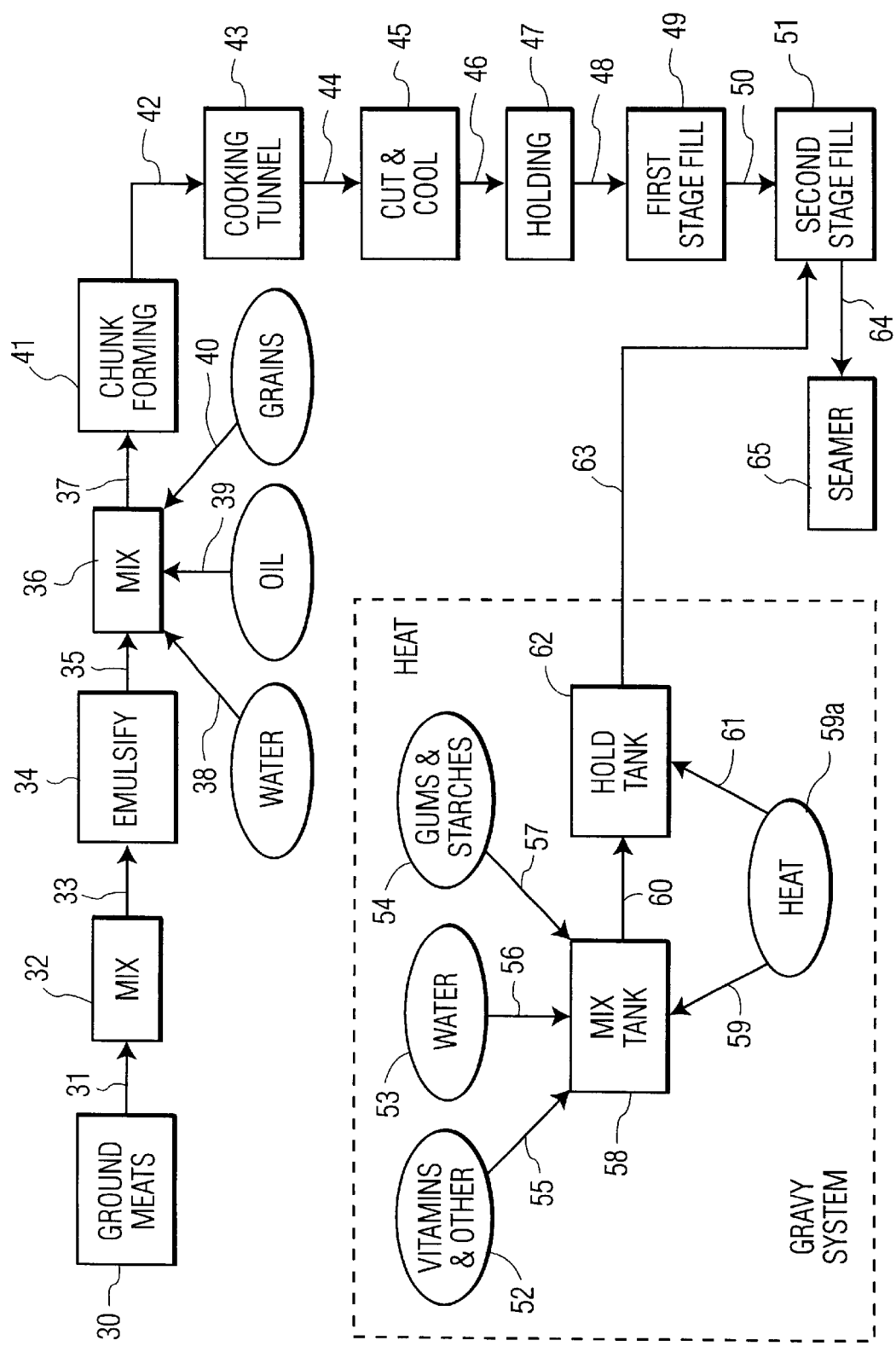
FIG. 2: Prior art chunk and gravy process

The chunk and gravy process is shown in FIG. 2. Meats are ground in a container, 30 and transferred through line 31 to a mixer, 32 and then transferred to an emulsifier 34, through line 33. After emulsification, they are transferred to a second mixer, 36, through line 35 where they are mixed with water transferred to the mixer through line 38, oil transferred to the mixer through line 39, and grains transferred to the mixer through line 40. After thorough mixing, the total mixture is transferred to a chunk forming apparatus, 41 through line 37. The formed chunks are then transferred to a cooking tunnel, 43 through line 42, where they are further cooked and then to an apparatus, 45, which cuts and cools the formed diet through line 44. The diet is now transferred to a holding tank, 47 through line 46, and then transferred through line 48 to a first stage fill 49, where it is held. During this process, the gravy system is prepared in a mixing tank 59, which is fed vitamins and other small quantities of various additives 52 through line 55, water from 53 through line 56, and various gums and starches utilized in the gravy system from 54 through line 57. In tank 58, they are then thoroughly mixed with heat added through line 59 from a heat reservoir, 59a, and then transferred to a holding tank, 62 through line 60. Additional heat may be necessary in the holding tank and is transferred through line 61. The gravy system is now transferred to the second stage fill system, 51, through line 63. During this time, the chunk formulation is also transferred to the second stage fill, 51 through line 50, which is the line coming from the first stage fill, 49. Within the second stage fill, the chunk diet is thoroughly coated and mixed with the gravy system. This mixture is then transferred to a seamer 65, through line 64.

Figure 3:
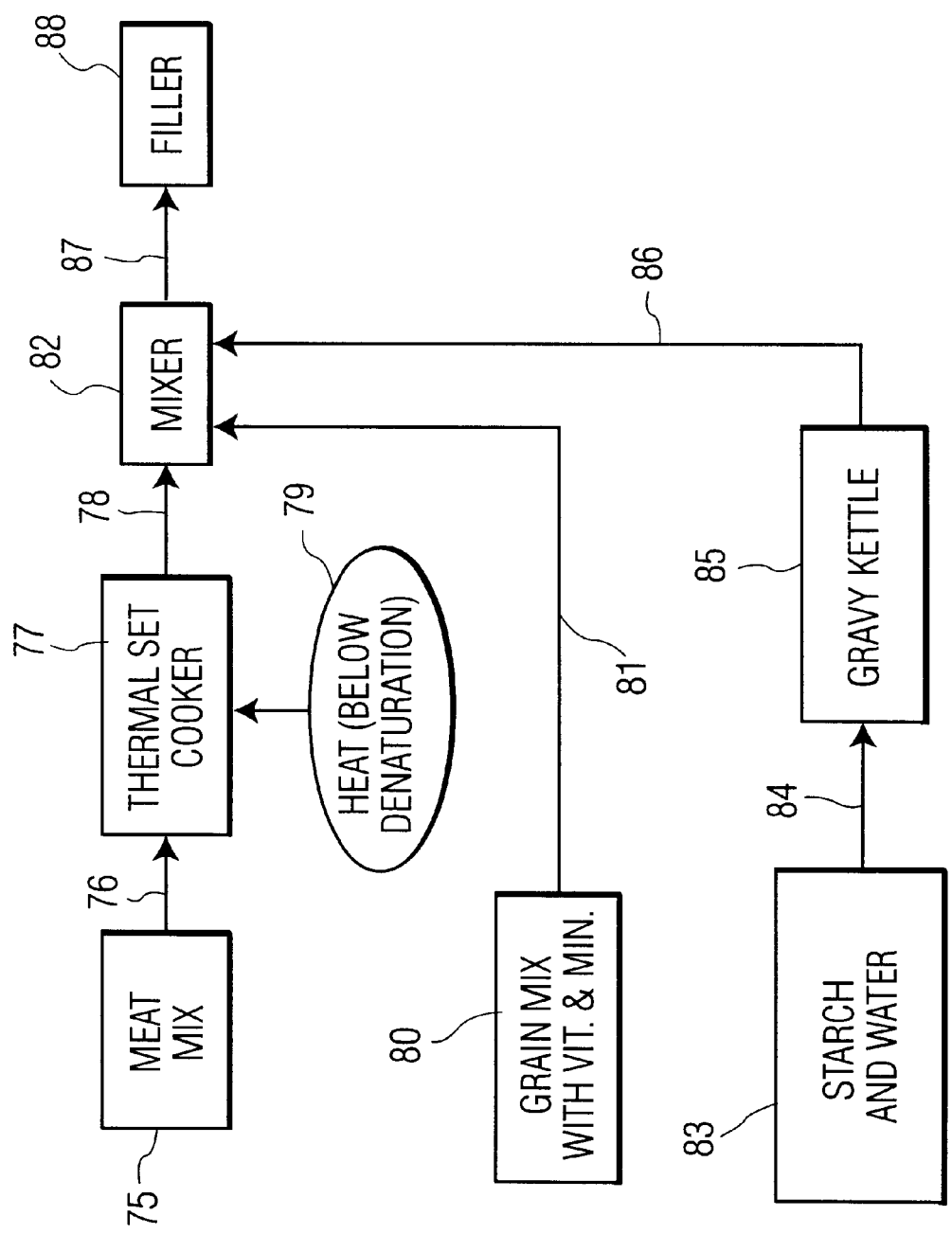
FIG. 3: Invention "thermal set" process

FIG. 3 shows the inventive thermal set process of this disclosure. It is readily observed that the steps are significantly less and provide a diet, which is substantially different in appearance than either the chunk in gravy or the ground loaf products. The meats are mixed in a mixer, 75 and transferred through lines 76 to a cooker, 77. After being cooked at a temperature at or below the denaturation point of the meats or the mixture of meats, the mixture is transferred to a second mixer, 82, through line 78. During this time period, the grains utilized in the formulation are mixed with various vitamins and minerals in container, 80, and transferred through line 81 to the mixer 82. Also, during this time, the non-chemically modified starches, natural starches, and/or carbohydrates and water are mixed together in container, 83, transferred to the cooker 85 through line 84, wherein they are cooked and then transferred through line 86 to mixer 82, wherein all three components are mixed together at the prevailing temperature. Heat can be added to maintain the prevailing temperature, if desired, but it is generally not necessary nor desirable to go above about 180° F. This diet is then transferred to filler 88, through line 87. In this manner, the diet of this disclosure is readily prepared.

Figure 4:
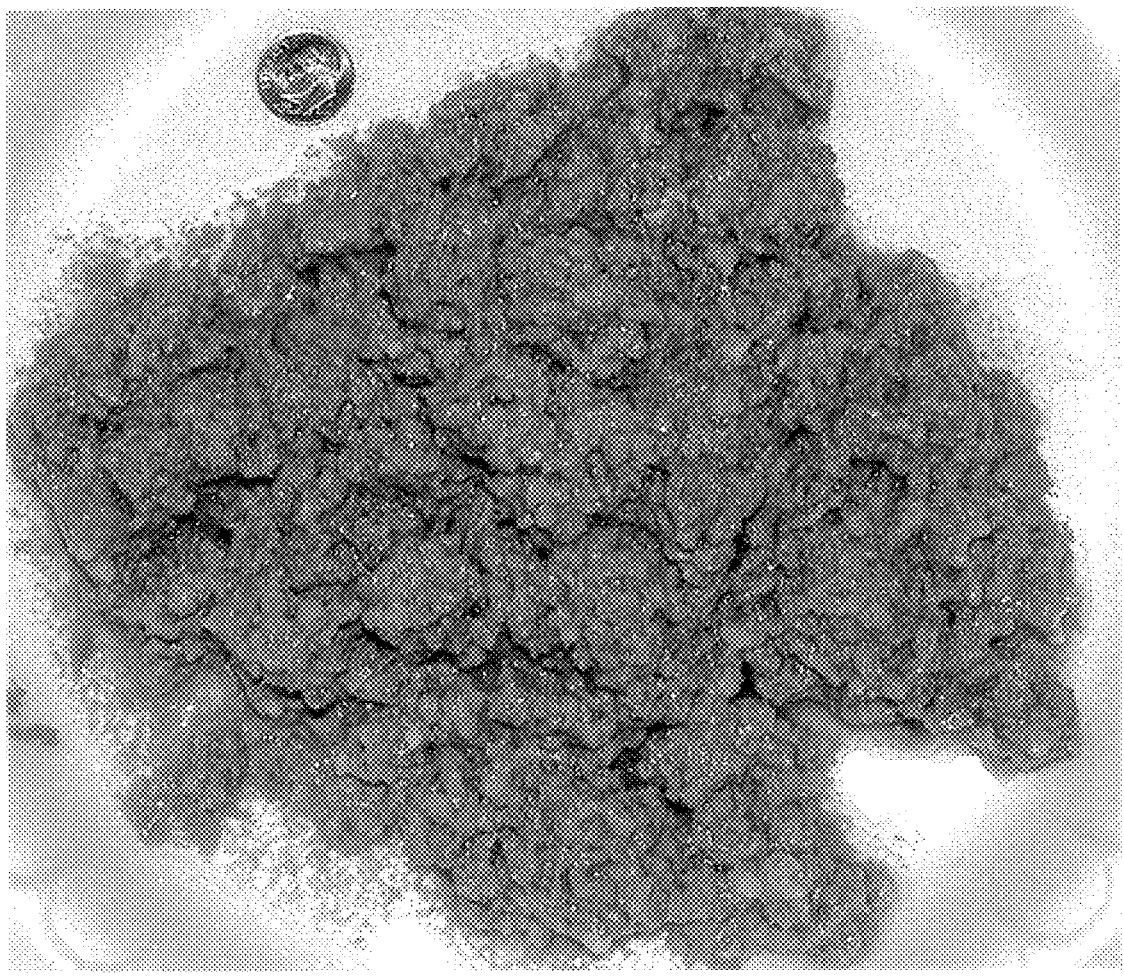
FIG. 4: Photograph of diet produced by invention process

FIG. 4 is a photograph of the diet of the invention showing the appearance of the diet.

In further description, a meat protein source, component (a), a grain mix with vitamin and mineral component (b), and non-chemically modified starch, natural starch and/or carbohydrate/water, component (c) are mixed together in a mixer to provide a mass having meat particles with a moisturized appearance and visually recognizable discrete food particles when filled into a can.

A meat protein source is a meat mix either fresh or thawed out frozen meat blocks such as meat or meat by-products. Meat materials can be animal protein muscle or skeletal meats of mammals, fish, poultry or meat by-products such as hearts, livers, lungs, tongues and the like. The meat protein source is generally ground through different grindplates ranging from about ×inch to about 1 inch, depending on the discrete food particle size requirements in the finished product.

Generally, the meat preferably comprises about 15 to 25% protein with a moisture content range from about 55 to 75% by weight and the fat content about 5 to 15%.

The composite meat mix is mixed and heated in any suitable mixer/cooker. For example, a twin screw mixer, a twin ribbon mixer, an overlapping paddle mixer, or a combination of the above mentioned features such as screw/ribbon/paddle with live steam injection. Mixing is to ensure that the meat mix is homogeneously coagulated at or below the temperature of protein denaturation of the said meat protein source. This generally ranges from about 120° F. for fish protein to about 170° F. or higher for skeletal muscle protein of mammals (cattle and lamb). Lying somewhere in between this range are the denaturation temperatures of muscles from chicken and pigs. If there is a combination of such meats, the temperature of heating is at or below the denaturation temperature of the mixture.

In order to provide the recognizable discrete meat particles in finished product, the mixer/cooker provides sufficient mixing as well as good temperature control during mixing and heating. An overheated meat protein generally loses textural integrity, therefore losing discrete particle appearance.

Grain mix with preferably added vitamin and mineral, component (b), can be a single grain, or a mixture of grains such as oat fiber, cellulose, peanut hull, beet pulp, parboiled rice, and corn gluten meal with added salt, spices, seasonings, vitamins, minerals, flavorants, colorants, and the like. The amount of this additive mixture is at least partially dependent on the nutritional requirements for different life stages of the animals based on Association of American Feed Control Officials regulations (AAFCO).

The temperature of heating during mixing ranges from about 150° F. to about 180° F. to achieve or essentially achieve hydration, gelatinization and/or retrogradation of grain/carbohydrate for certain desired texture of diet. Complex carbohydrate is broken down to simpler carbohydrate.

Component (c) is generally comprised of materials as previously noted. These materials are selected to provide pre-processing (thick) viscosity for filling requirement when these 3 main components (a), (b), and (c) are mixed together in a mixer. The pre-processing viscosity is important in preventing component separation during filling the 3 components as a single entity at the filler. Native or non-chemically modified starch has the characteristics of thick and thin, therefore, it is thick during filling, but viscosity will break down (thin) after retorting to provide the recognizable discrete meat particles in finished product.

Component (c) comprising the non-chemically modified starch, natural starch, and/or carbohydrate with the presence of water when exposed to thermal treatment will be hydrated, gelatinized and retrograded at temperatures up to 180 to 200° F. By properly balancing carbohydrate and/or the above starch sources, one can obtain the proper stickiness or binding for maintaining certain textures as desired. For example, it is now understood that short chain polysaccharides tend to be sticky and gluey and that long chain polysaccharides are less sticky and gluey than the shorter chains when processed. Generally speaking, shorter chain polysaccharide such as those obtained from ground whole wheat and corn are capable of "binding" with water to become sticky, which is detrimental if one desires a discrete particle texture in finished products. Examples of long chain polysaccharides are gums, cellulose and the like. This will provide less sticky, firmer final products.

Components (a), (b) and (c) are mixed in any suitable mixer without any further heating. Maintenance of the temperature achieved in the individual mixing steps, however, should be achieved. Allowing the temperature to fall too far mitigates the temperature treatment of each component alone. They enter this mixer at the temperature at or slightly below that which they were each treated at prior to this mixing together. For mixing purposes, a twin screw mixer, a twin ribbon mixer, or an overlapping paddle mixer can be sufficient. The mixing should be enough to ensure that all 3 components are formed into a single entity for filling.

Although not essential to the invention, the general wt % of the composition of the canine diet can be the following:

Meat—about 20 wt % to about 40 wt %, desirably about 25 wt % to about 35 wt %;

Grain—about 8 wt % to about 16 wt %, desirably about 9 wt % to about 13 wt %; and Gravy—about 40 wt % to about 55 wt %, desirably about 45 wt % to about 52 wt %.

The final mixture is filled into cans, which are then sealed and sterilized. In this case, the product produced a solid mass with recognizable discrete meat particles with a moisturized appearance.

With respect to the general times of various heat treatment (s) in the process of the invention, when preparing the meat component (a), incipient spoilage and too much coagulation should be avoided. Generally, heating is no more than about 15 to 20 minutes. Grain component (b) is generally pre-formed for canine diet, further heating is not necessary. Starch slurry (c), heating is generally not more than about 2 hours, otherwise, product appearance can be negatively affected.

EXAMPLE 1

A meat mix comprising skeletal muscle from poultry or swine and its meat by-products is prepared using about 30% of the total weight of finished product. The resultant meat mix has moisture content of 73.12%, 16.13% protein, and 9.00% fat. Such meat protein source is homogeneously mixed and coagulated at 150 to 160 degree F with live steam in a ribbon/paddle mixer. The coagulated or thermally set meat component picks up about 5% steam condensate, therefore coagulated meat component comprises 34 to 35% of the total weight of finished product.

A grain mix comprising 4 wt. % parboiled rice and 7 wt. % cellulose at a total of 11% of the total weight of finished product with minerals and vitamin, colorant and flavor about 1% by weight of finished product is prepared.

A cooked starch slurry component is then prepared by mixing together 4% National 150 starch, 4% Novation starch 2300 and water/steam making up the remainder (all percentage by weight of starch slurry. The starch slurry is then heated to 190 to 200 degree F. to develop a target viscosity of 5 to 8 cm/30 seconds @ 180 degree F. (Botswick Consistometer).

Immediately after all 3 components are prepared separately as described above, they are evenly blended in a regular mixer without further heating. The blending ratio of meat component, grain component and starch slurry is 36:12:52 wt. %, respectively. The final mixture is filled into cans, sealed and sterilized. The resultant product after sterilization has a hearty ground texture appearance with visually recognizable meat particles which neither resembles ground loaf nor chunks and gravy products.

EXAMPLE 2

A meat mix comprising skeletal muscle from cattle, poultry, swine and its meat by-products is prepared using about 38% of the total weight of finished product. The resultant meat mix has moisture content of 69.97%, 14.51% protein, and 13.60% fat. Such meat protein source is homogeneously mixed and coagulated at 160 to 170 degree F. with live steam in a ribbon/paddle mixer. The coagulated or thermally set meat component picks up about 5% steam condensate. Therefore, the resultant component comprises about 42 to 43% of the total weight of finished product.

A grain mix comprising of 5 wt. % pearled barley and 4 wt. % cellulose at a total of 9% of the total weight of finished product with vitamin, minerals and colorant about 1.5% by weight of finished product is blended together.

A starch slurry is prepared by mixing together 5 wt. % National 150 starch, 3 wt. % Remy DR rice starch, and water/steam making up the remainder (all percentage by weight of starch slurry). The starch slurry is then heated to 190 to 200 degree F. to develop a target viscosity of 5 to 8 cm/30 seconds @ 180 degree F. (Botswick Consistometer) for filling requirement.

Immediately after all three components are prepared separately as described above, they are evenly blended into a regular mixer without further heating. The blending ratio of meat component, grain component and starch slurry is 43:11:46 wt. %, respectively. The resultant product after sterilization has a hearty ground texture appearance with visually recognizable meat particles which neither resembles ground loaf or chunks and gravy products.

What is claimed is:

1. A process for preparing a meat and carbohydrate based canine pet food composition having a solid mass essentially assuming the shape of its container which comprises:

(a) heating the meat portion of the pet food composition to a temperature at or below the denaturation point of the meat portion, (b) mixing separately from the meat portion in (a) and the fluid or slurry in (c) a non-chemically modified carbohydrate or a mixture of non-chemically modified carbohydrates together with water to a temperature that will achieve or essentially achieve hydration, gelatinization and retrogradation of the carbohydrate or mixture of carbohydrates; and (c) preparing separately from the meat portion in (a) and non-chemically modified carbohydrate or mixture of non-chemically modified carbohydrates of (b) a viscosity building fluid or slurry comprising a non-chemically modified carbohydrate or mixture thereof which when combined with the meat portion in (a) and the non-chemically modified carbohydrate or mixture thereof of (b) forms at least an essentially homogeneous mass during a container filling process, and (d) combining the meat portion of (a) the non-chemically modified carbohydrates or mixture thereof of (b) and the liquid or slurry of (c) and mixing while maintaining the temperature of the combination.

2. A process in accordance with claim 1 wherein component (a) is heated to about 180° F. or higher for a diet having skeleton muscle protein of cattle.

3. A process in accordance with claim 1 wherein the non-chemically modified carbohydrate of (b) is selected from the group consisting of oat fiber, cellulose, peanut hull, beet pulp, parboiled rice, cornstarch, corn gluten meal and a mixture thereof.

4. A process in accordance with claim 1 where the fluid or slurry comprises cornstarch, guar gum, glucose, sucrose, high fructose corn syrup, or a mixture.

* * * * *